(12) United States Patent
Edge et al.

(10) Patent No.: US 9,312,970 B2
(45) Date of Patent: *Apr. 12, 2016

(54) LOCATION AND TIME BASED FILTERING OF BROADCAST INFORMATION (71) Applicant: QUALCOMM Incorporated, San Diego, CA (US)

(72) Inventors: Stephen William Edge, Escondido, CA (US); Andreas Klaus Wachter, Menlo Park, CA (US); Prasanna Kannan, San Diego, CA (US); Charles N Lo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,443

(22) Filed: Jun. 21, 2013

(65) Prior Publication Data

US 2013/0281007 A1    Oct. 24, 2013

Related U.S. Application Data

(63) Continuation of application No. 12/244,654, filed on Oct. 2, 2008.

(60) Provisional application No. 60/978,104, filed on Oct. 5, 2007, provisional application No. 60/990,890, filed on Nov. 28, 2007, provisional application No. 61/007,349, filed on Dec. 11, 2007, provisional application No. 61/029,252, filed on Feb. 15, 2008.

(51) Int. Cl.
*H04H 20/71* (2008.01)
*H04H 20/61* (2008.01)
(Continued)

(52) U.S. Cl.
CPC .............. *H04H 20/61* (2013.01); *H04H 60/65* (2013.01); *H04W 4/021* (2013.01); *H04W 4/027* (2013.01);
(Continued)

(58) Field of Classification Search
CPC ....... H04W 4/02; H04W 4/021; H04W 4/028; H04W 4/027
USPC .............................. 455/3.01, 3.03, 3.04, 3.05
IPC .................................. H04W 4/02, 4/021, 4/028
See application file for complete search history.

(56) References Cited

U.S. PATENT DOCUMENTS 3,277,358 A    10/1966    Nicholl
4,764,853 A    8/1988    Thomas et al.
(Continued)

FOREIGN PATENT DOCUMENTS

CN    102195994 A    9/2011
EP    1085685 A2    3/2001
(Continued)

OTHER PUBLICATIONS

Advanced Television Systems Committee, "ATSC Candidate Standard: Non-Real-Time Content Delivery," Doc. TSG-876r1, Dec. 2, 2010, pp. 1-118.
(Continued)

*Primary Examiner* — Jean Gelin
(74) *Attorney, Agent, or Firm* — Mahmoud Munes Tomeh (57) ABSTRACT

Techniques for sending and receiving broadcast information are described. In an aspect, broadcast metadata may be generated for broadcast information and may include location and time criteria used by terminals to filter the broadcast information. Each location and time criterion may include (i) a location criterion given by a target location and a presence or absence requirement and (ii) a time criterion given by a time period in which the location criterion applies. A terminal may receive the broadcast metadata prior to or with the broadcast information, obtain location and time criteria from the broadcast metadata, and filter the broadcast information based on the location and time criteria. The terminal may evaluate each location and time criterion by determining its location within a specified time period and determining whether its location is within or outside a specified target location, as indicated by the presence or absence requirement.

20 Claims, 4 Drawing Sheets

(51) Int. Cl.
*H04H 60/65* (2008.01)
*H04W 4/02* (2009.01)
*H04H 60/40* (2008.01)
*H04H 60/51* (2008.01)
*H04H 60/53* (2008.01)
*H04W 4/00* (2009.01)
*H04W 4/06* (2009.01)

(52) U.S. Cl.
CPC .............. *H04H 60/40* (2013.01); *H04H 60/51* (2013.01); *H04H 60/53* (2013.01); *H04W 4/001* (2013.01); *H04W 4/06* (2013.01)

(56) References Cited

U.S. PATENT DOCUMENTS

| | | |
|---|---|---|
| 5,432,542 A | 7/1995 | Thibadeau et al. |
| 5,636,245 A | 6/1997 | Ernst et al. |
| 5,740,369 A | 4/1998 | Yokozawa et al. |
| 5,948,043 A | 9/1999 | Mathis |
| 6,032,053 A | 2/2000 | Schroeder et al. |
| 6,216,385 B1 | 4/2001 | Abe |
| 6,522,250 B1 | 2/2003 | Ernst et al. |
| 6,539,232 B2 | 3/2003 | Hendrey et al. |
| 6,587,835 B1 | 7/2003 | Treyz et al. |
| 6,633,765 B1 | 10/2003 | Maggenti |
| 6,801,779 B1 | 10/2004 | Liebenow |
| 6,856,604 B2 | 2/2005 | Lundby |
| 6,867,688 B2 | 3/2005 | Lamb |
| 6,975,346 B2 * | 12/2005 | Kumhyr ......................... 348/143 |
| 7,085,818 B2 | 8/2006 | Brown et al. |
| 7,271,765 B2 | 9/2007 | Stilp et al. |
| 7,565,153 B2 | 7/2009 | Alcock et al. |
| 7,672,678 B2 | 3/2010 | Gaw |
| 7,706,740 B2 | 4/2010 | Collins et al. |
| 7,895,121 B2 | 2/2011 | Lukose et al. |
| 8,311,048 B2 | 11/2012 | Mataga et al. |
| 2001/0022558 A1 | 9/2001 | Karr et al. |
| 2001/0045886 A1 | 11/2001 | Minowa |
| 2002/0087401 A1 | 7/2002 | Leapman et al. |
| 2003/0002536 A1 | 1/2003 | Wong et al. |
| 2003/0005451 A1 | 1/2003 | Connelly |
| 2003/0040272 A1 | 2/2003 | Lelievre et al. |
| 2003/0098929 A1 * | 5/2003 | Nono ............................ 348/731 |
| 2003/0129994 A1 | 7/2003 | Nagatsuma et al. |
| 2003/0169185 A1 | 9/2003 | Taylor |
| 2005/0096065 A1 | 5/2005 | Fleischman |
| 2005/0120050 A1 | 6/2005 | Myka et al. |
| 2005/0177846 A1 | 8/2005 | Maruyama et al. |
| 2005/0281209 A1 * | 12/2005 | Cai et al. ..................... 370/270 |
| 2006/0080029 A1 | 4/2006 | Kodani et al. |
| 2006/0121912 A1 | 6/2006 | Borjesson |
| 2006/0133338 A1 | 6/2006 | Reznik et al. |
| 2006/0156209 A1 | 7/2006 | Matsuura et al. |
| 2006/0218586 A1 | 9/2006 | Pohjolainen et al. |
| 2006/0229058 A1 | 10/2006 | Rosenberg |
| 2006/0248090 A1 | 11/2006 | Bennett et al. |
| 2006/0253453 A1 | 11/2006 | Chmaytelli et al. |
| 2007/0026871 A1 | 2/2007 | Wager |
| 2007/0054634 A1 | 3/2007 | Seppala |
| 2007/0087756 A1 | 4/2007 | Hoffberg |
| 2007/0101391 A1 | 5/2007 | Hwang et al. |
| 2007/0124395 A1 | 5/2007 | Edge et al. |
| 2007/0168655 A1 | 7/2007 | Thomasson et al. |
| 2007/0202886 A1 | 8/2007 | Dhebri et al. |
| 2007/0204004 A1 | 8/2007 | Coyer et al. |
| 2007/0259624 A1 | 11/2007 | Alizadeh-Shabdiz et al. |
| 2007/0283268 A1 | 12/2007 | Berger et al. |
| 2008/0020702 A1 * | 1/2008 | Jendbro ................ H03J 1/0075 455/3.01 |
| 2008/0060000 A1 | 3/2008 | Drouet et al. |
| 2008/0134264 A1 | 6/2008 | Narendra et al. |
| 2008/0140305 A1 * | 6/2008 | Kim ................ G08G 1/096716 701/117 |
| 2008/0201746 A1 | 8/2008 | Xu et al. |
| 2008/0248813 A1 * | 10/2008 | Chatterjee .................. 455/456.2 |
| 2008/0256139 A1 * | 10/2008 | Jessee .......................... 707/202 |
| 2009/0005067 A1 | 1/2009 | Ernst et al. |
| 2009/0019509 A1 | 1/2009 | Horn et al. |
| 2009/0089535 A1 | 4/2009 | Lohmar et al. |
| 2009/0093259 A1 | 4/2009 | Edge et al. |
| 2009/0177942 A1 | 7/2009 | Hannuksela et al. |
| 2009/0178081 A1 * | 7/2009 | Goldenberg et al. ........... 725/46 |
| 2009/0207839 A1 | 8/2009 | Cedervall et al. |
| 2009/0210510 A1 | 8/2009 | Bouazizi |
| 2009/0252070 A1 | 10/2009 | Connors et al. |
| 2009/0288116 A1 | 11/2009 | Zalewski |
| 2009/0307564 A1 | 12/2009 | Vedantham et al. |
| 2010/0050032 A1 | 2/2010 | Bichot et al. |
| 2010/0146077 A1 | 6/2010 | Davies et al. |
| 2010/0151882 A1 | 6/2010 | Gillies et al. |
| 2010/0162334 A1 | 6/2010 | Suh et al. |
| 2010/0162339 A1 | 6/2010 | Suh et al. |
| 2010/0180007 A1 | 7/2010 | Suh et al. |
| 2010/0299702 A1 | 11/2010 | Lo et al. |
| 2011/0064082 A1 | 3/2011 | Zalewski |
| 2011/0075612 A1 | 3/2011 | Guo et al. |
| 2011/0258049 A1 | 10/2011 | Ramer et al. |
| 2011/0289542 A1 | 11/2011 | Kitazato et al. |
| 2012/0239785 A1 | 9/2012 | Pazos |
| 2012/0303745 A1 | 11/2012 | Lo et al. |
| 2013/0097641 A1 | 4/2013 | Suh et al. |
| 2014/0044108 A1 * | 2/2014 | Earnshaw ............. G01S 5/0063 370/336 |
| 2014/0143061 A1 * | 5/2014 | Abhyanker ............ G06Q 50/01 705/14.58 |
| 2014/0180914 A1 * | 6/2014 | Abhyanker ............... G01C 1/00 705/39 |
| 2014/0237062 A1 * | 8/2014 | Abhyanker .......... G06Q 3/0261 709/206 |

FOREIGN PATENT DOCUMENTS

| | | |
|---|---|---|
| EP | 1209886 A2 | 5/2002 |
| EP | 1903757 A1 | 3/2008 |
| GB | 2363829 | 12/2001 |
| GB | 2404115 | 1/2005 |
| GB | 2406468 | 3/2005 |
| JP | S63310234 A | 12/1988 |
| JP | 1198549 A | 8/1989 |
| JP | 3131131 A | 6/1991 |
| JP | H0621905 A | 1/1994 |
| JP | 7220196 A | 8/1995 |
| JP | H088859 A | 1/1996 |
| JP | H08181702 A | 7/1996 |
| JP | H09212484 A | 8/1997 |
| JP | 10504392 T | 4/1998 |
| JP | 11041639 A | 2/1999 |
| JP | 2000252930 | 9/2000 |
| JP | 2000261462 A | 9/2000 |
| JP | 2001197021 A | 7/2001 |
| JP | 2002026836 A | 1/2002 |
| JP | 2002044012 | 2/2002 |
| JP | 2002135826 A | 5/2002 |
| JP | 2002186033 A | 6/2002 |
| JP | 2002232933 A | 8/2002 |
| JP | 2002237760 A | 8/2002 |
| JP | 2002531997 A | 9/2002 |
| JP | 2002290564 A | 10/2002 |
| JP | 2002325069 A | 11/2002 |
| JP | 2002334029 A | 11/2002 |
| JP | 2003018108 A | 1/2003 |
| JP | 2003030194 A | 1/2003 |
| JP | 2003143642 A | 5/2003 |
| JP | 2003153334 A | 5/2003 |
| JP | 2004112135 A | 4/2004 |
| JP | 2004128543 A | 4/2004 |
| JP | 2004236125 A | 8/2004 |
| JP | 2004297394 A | 10/2004 |
| JP | 2004533779 A | 11/2004 |
| JP | 2005051781 A | 2/2005 |
| JP | 2005165454 A | 6/2005 |
| JP | 2005308410 A | 11/2005 |
| JP | 2006033008 A | 2/2006 |

(56) References Cited

FOREIGN PATENT DOCUMENTS

| | | | |
|---|---|---|---|
| JP | 2006080843 A | 3/2006 |
| JP | 2007129731 A | 5/2007 |
| JP | 2007135105 A | 5/2007 |
| JP | 2007295610 A | 11/2007 |
| JP | 2007300168 A | 11/2007 |
| JP | 2008538250 A | 10/2008 |
| JP | 2009519624 A | 5/2009 |
| JP | 2009539304 A | 11/2009 |
| JP | 2010502143 A | 1/2010 |
| KR | 20050049418 A | 5/2005 |
| RU | 2004121994 A | 1/2006 |
| RU | 2273956 C2 | 4/2006 |
| WO | 9605678 A1 | 2/1996 |
| WO | 0022860 A1 | 4/2000 |
| WO | WO-0033493 A1 | 6/2000 |
| WO | 0174034 A2 | 10/2001 |
| WO | 0186505 A2 | 11/2001 |
| WO | 0186508 A2 | 11/2001 |
| WO | 0219741 A2 | 3/2002 |
| WO | WO-02099983 A1 | 12/2002 |
| WO | 03043210 A1 | 5/2003 |
| WO | 03055142 | 7/2003 |
| WO | 2004077291 A1 | 9/2004 |
| WO | 2005086521 A1 | 9/2005 |
| WO | 2005125238 A1 | 12/2005 |
| WO | 2006100571 A1 | 9/2006 |
| WO | 2006105434 A2 | 10/2006 |
| WO | 2007038355 | 4/2007 |
| WO | 2007049840 A1 | 5/2007 |
| WO | 2007078252 A2 | 7/2007 |
| WO | 2007130150 | 11/2007 |
| WO | WO-2008025578 A1 | 3/2008 |

OTHER PUBLICATIONS

Camarillo, et al., "The Session Description Protocol (SDP) Grouping Framework," Internet Engineering Task Force (IETF), Request for Comments: 5888, Obsoletes: 3388, Category: Standards Track, ISSN: 2070-1721, Jun. 2010.

Faria G., et al., "DVB-H: Digital Broadcast Services to Handheld Devices", Proceedings of the IEEE, vol. 94, No. 1, Jan. 2006.

Frojdh P., et al., "Study on 14496-12:2005/PDAM2 ALU/ FLUTE Server File Format", 78.MPEG Meeting; Oct. 23, 2006-Oct. 27, 2006; Hangzhou: (Motion Picturexpert Group or ISO/IEC JTC1/ SC29/WG11),, No. M13855, Oct. 13, 2006, XP030042523, ISSN: 0000-0233.

Hui, et al., "A General Architecture in Support of Personalized, Interactive Multimedia Services in the Mobile Broadcast Convergent Environment," Testbeds and Research Infrastructure for the Development of Networks and Communities, 2007. TridentCom 2007, pp. 1-6.

International Search Report and Written Opinion—PCT/US2008/ 078832, International Search Authority, European Patent Office, Mar. 2, 2009.

Paila T., et al: "FLUTE—File Delivery over Unidirectional Transport; draft-ietf-rmt-flute-revised-11.txt", Internet Engineering Task Force, IETF; Standardworkingdraft, Internet Society (ISOC) 4, RUE DES Falaises CH-1205 Geneva, Switzerland, No. 11, Mar. 26, 2010, pp. 1-42, XP015067217.

Taiwan Search Report—TW097138328—TIPO—Nov. 18, 2012.

Joshi et al., "Simplified transforms for extended block sizes", ITU-T SG16 Q6 (VCEG), Document VCEG-AL30, 38th VCEG Meeting, Jul. 6-10, 2009, Geneva, CH, Jul. 3, 2009, XP030003711, Retrieved from the Internet: URL: http://wftp3.itu.int/av-arch/video-site/ 0906_LG/VCEG-AL30.zip.

Partial European Search Report—EP12006749—Search Authority—Hague—Aug. 27, 2013.

Nobena Y., "Rise of the idea <Opt-in Schedule>," Mobile greatly changes business style! [With graphics], All about "m-commerce," PHP Inc. Oct. 16, 2000, 1st edition, pp. 154-157.

Open Mobile Alliance, Service Guide for Mobile Broadcast Services, OMA-TS-BCAST Service Guide, Approved Version 1.1—Oct. 29, 2013, pp. 1-299.

Taiwan Search Report—TW097138328—TIPO—Mar. 1, 2014.

\* cited by examiner

LOCATION AND TIME BASED FILTERING OF BROADCAST INFORMATION

CROSS-REFERENCE TO RELATED ACTIONS

This application is a continuation of U.S. application Ser. No. 12/244,654, entitled "LOCATION AND TIME BASED FILTERING OF BROADCAST INFORMATION," filed Oct. 2, 2008, which claims priority to Provisional U.S. Application Ser. No. 60/978,104, entitled "LOCATION AND TIME BASED FILTERING OF BROADCASTS," filed Oct. 5, 2007, Provisional U.S. Application Ser. No. 60/990,890 entitled "LOCATION BASED BROADCAST ENHANCEMENT," filed Nov. 28, 2007, Provisional U.S. Application Ser. No. 61/007,349, entitled "LOCATION BASED SERVICES ENHANCEMENT WITH NOTIFICATION," filed Dec. 11, 2007, and Provisional U.S. Application Ser. No. 61/029,252 entitled "LOCATION BASED SERVICES ENHANCEMENT WITH NOTIFICATION," filed Feb. 15, 2008, all assigned to the assignee hereof and expressly incorporated herein by reference.

BACKGROUND

I. Field

The present disclosure relates generally to communication, and more specifically to techniques for sending and receiving broadcast information.

II. Background

A communication network may broadcast various types of information such as commercial advertisements, news, weather and travel advisories, segments of film, educational items, television shows or sports events, public warning messages, etc. A given user may be interested in receiving only some of the broadcast information sent by the network. The user may manually identify broadcast information of interest to the user and may either save or display the broadcast information on a receiver, e.g., a cellular phone. This manual filtering of broadcast information may be tedious. It may be desirable to automatically identify broadcast information of potential interest to the user.

SUMMARY

Techniques for sending and receiving broadcast information are described herein. In an aspect, broadcast metadata may be generated for broadcast information and may comprise location and time criteria used by terminals to filter the broadcast information. The location and time criteria may comprise at least one location and time criterion. In one design, each location and time criterion may comprise (i) a location criterion given by a target location and a presence or absence requirement and (ii) a time criterion given by a time period in which the location criterion applies. This time period may be in the past, present, or future.

In one design, a terminal may receive broadcast metadata associated with broadcast information, e.g., prior to or with the broadcast information. The terminal may obtain location and time criteria from the broadcast metadata and may filter the broadcast information based on the location and time criteria. The terminal may evaluate each location and time criterion by (i) determining its location within a specified time period and (ii) determining whether its location is within or outside a specified target location, as indicated by the presence or absence requirement. The terminal may combine the results of all location and time criteria to determine whether or not to receive and/or present the broadcast information.

The terminal may skip receiving the broadcast information if the location and time criteria are not satisfied. The terminal may receive the broadcast information at one time instant and may present the broadcast information at the same or later time instant if the location and time criteria are satisfied. The broadcast information may be related to an event occurring over a designated time interval. The terminal may receive the broadcast information prior to the designated time interval (e.g., during off-peak traffic hours) and may present this information to the user during the designated time interval.

Various aspects and features of the disclosure are described in further detail below.

DETAILED DESCRIPTION

The techniques described herein may be used to receive information from various wireless and wireline communication networks. The terms "network" and "system" are often used interchangeably. For example, the techniques may be used to receive information from cellular networks, broadcast networks, etc. The techniques may be used to receive broadcast information sent to all users, multicast information sent to a group of users, and unicast information sent to a specific user. For clarity, certain aspects of the techniques are described below for receiving broadcast information from a communication network.

Figure 1:
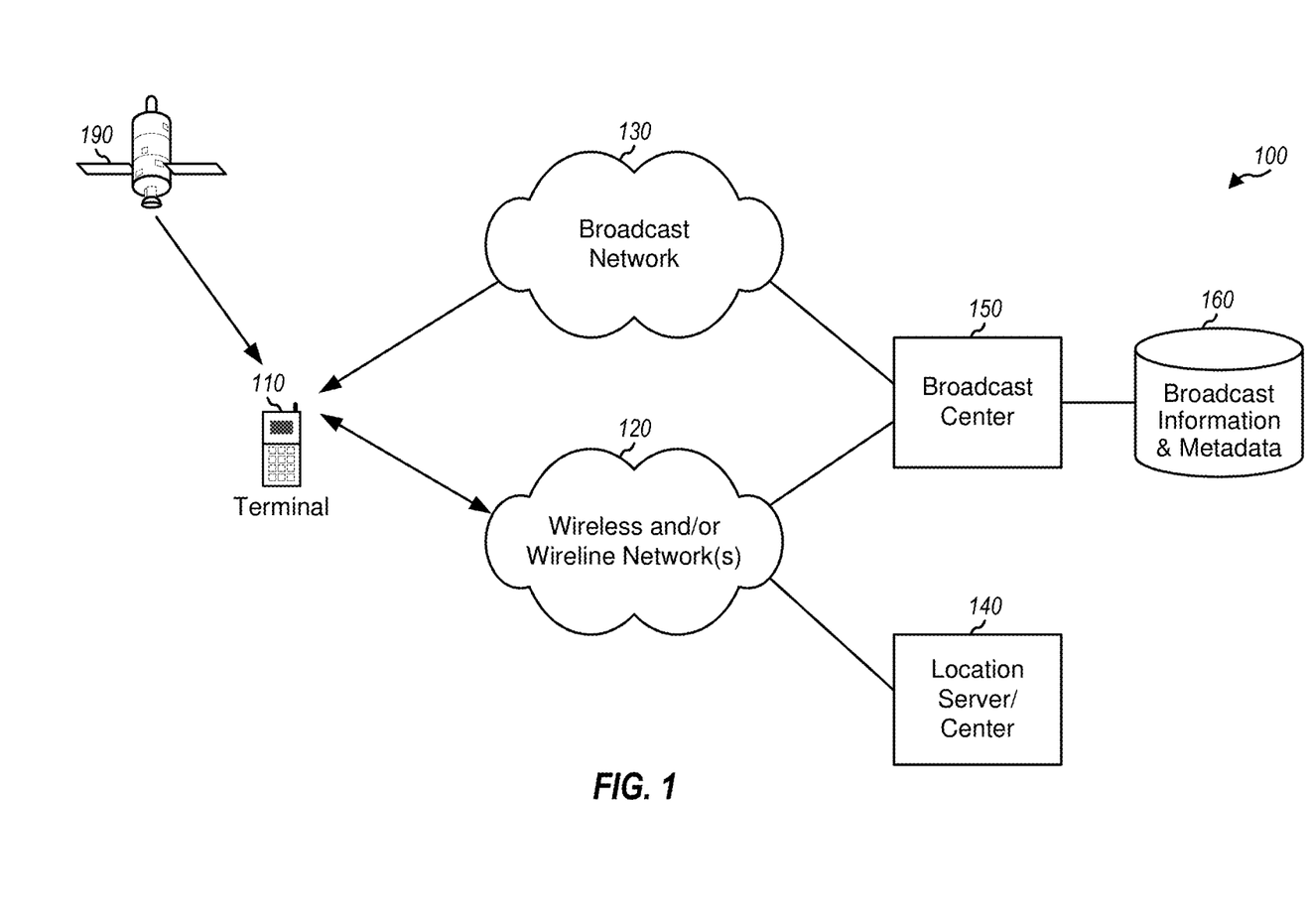
FIG. 1 shows an example network deployment.

FIG. 1 shows an example deployment 100 supporting the techniques described herein. A terminal 110 may communicate with one or more wireless and/or wireline networks 120 to obtain communication services and/or data connectivity. Terminal 110 may communicate with one or more base stations in a wireless network and/or one or more servers in a wireline network. Terminal 110 may also receive broadcast information from a broadcast network 130. Terminal 110 may be stationary or mobile and may also be referred to as a mobile station, a user equipment, an access terminal, a subscriber unit, a station, etc. Terminal 110 may be a cellular phone, a personal digital assistant (PDA), a wireless device, a wireline device, a wireless modem, a laptop computer, a personal computer (PC), a broadcast receiver, etc. The functions of terminal 110 may be spread over more than one device, e.g., transmission and reception may be supported in a PDA or a cellular phone while an associated laptop or PC may perform filtering of broadcast information and presentation of filtered broadcast information to a user.

Terminal 110 may also receive signals from one or more satellites 190, which may be part of the United States Global Positioning System (GPS), the European Galileo system, the Russian GLONASS system, or some other Global Navigation Satellite System (GNSS). Terminal 110 may measure signals from satellites 190 and obtain pseudo-range measurements for the satellites. Terminal 110 may also measure signals from base stations in a wireless network and obtain timing measurements for the base stations. The pseudo-range measurements and/or the timing measurements may be used to derive a location estimate for terminal 110. A location estimate is also referred to as a position estimate, a position fix, etc.

Network(s) 120 may include a wireless network that provides radio communication for terminals located within its coverage area. A wireless network may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. Alternatively or additionally, network(s) 120 may include a wireline network such as a local area network (LAN), a digital subscriber line (DSL) network, a packet cable network, an Internet Service Provider (ISP) network, a telephone network, the Internet, and/or other voice and data networks. Broadcast network 130 may provide broadcast services and may implement MediaFLO™, Digital Video Broadcasting for Handhelds (DVB-H), Integrated Services Digital Broadcasting for Terrestrial Television Broadcasting (ISDB-T), or some other digital transmission technology. Broadcast network 130 may also assist terminal 110 in determining its location. For example, terminal 110 may measure signal timing information from one or more broadcast transmitters and may determine its location via triangulation, trilateration, or some other means.

A location server/center 140 may comprise a location server that supports positioning for terminal 110 and other location services (LCS) clients. The location server may perform various functions to support positioning, e.g., calculate location estimates, deliver assistance data to terminals, perform functions for security, etc. Positioning refers to a process to determine a geographic or civil location estimate for an LCS target, e.g., obtain latitude, longitude and altitude coordinates for geographic location or a street address for civil location. The location server may support one or more location architectures/solutions such as Secure User Plane Location (SUPL) from Open Mobile Alliance (OMA), 3GPP control plane from an organization named "3rd Generation Partnership Project" (3GPP), 3GPP2 control plane from an organization named "3rd Generation Partnership Project 2" (3GPP2), etc. The location server may comprise a SUPL Positioning Center (SPC), a 3GPP Serving Mobile Location Center (SMLC), a 3GPP2 Position Determining Entity (PDE), etc.

Location server/center 140 may also comprise a location center that supports location services for terminal 110 and other LCS clients. The location center may perform various functions such as support of location services, support of subscriber privacy, authorization, authentication, charging/billing, service management, etc. The location center may comprise a SUPL Location Center (SLC), a SUPL Location Platform (SLP), a 3GPP Gateway Mobile Location Center (GMLC), a 3GPP2 Mobile Position Center (MPC), etc. The location server and location center may be integrated (as shown in FIG. 1) or may be separate entities.

A broadcast center 150 may provide broadcast information for broadcast services. The broadcast information may comprise any information that may be of interest to users, e.g., advertisements, news, etc. Broadcast center 150 or some other entity may also provide broadcast metadata for the broadcast information. The broadcast metadata may comprise data regarding the broadcast information and may also be referred to as broadcast description data, description information, broadcast description, filtering data, metadata, etc. A storage unit 160 may store the broadcast information and broadcast metadata. Broadcast center 150 may provide the broadcast information and broadcast metadata to network(s) 120 and/or broadcast network 130. The broadcast information and broadcast metadata may be sent together or separately by network(s) 120 and/or broadcast network 130.

The broadcast metadata may enable a terminal to perform initial filtering of the broadcast information, typically in conjunction with stored user preferences. The broadcast metadata may enable the terminal to make a decision regarding whether to receive the broadcast information and present this information to the user. The user preferences may be entered previously by the user into the terminal or may be ascertained in other manners, e.g., by observing the user preference for manually selecting previous broadcast information and the criteria that apply to the selected broadcast information. The initial filtering by the terminal may reduce burden on the user of having to scan through and select particular broadcasts from possibly a large number broadcasts occurring at the same time and/or over a period of time (e.g., day or week). Based on the outcome of the initial filtering, the terminal may alert the user to the presence of the broadcast information before, during, or after it has been received. The terminal may also store and/or present the broadcast information if it is of potential interest to the user or may silently ignore (e.g., not receive and store) the broadcast information. The manner of alerting the user to broadcast information that passes the initial filtering may also depend on the filtering. For example, an audible alarm may be provided for broadcasts of an emergency nature whereas commercial broadcasts may merely be saved and provided to the user following an explicit request.

In general, the broadcast metadata may comprise any data regarding the associated broadcast information. For example, the broadcast metadata may summarize various aspects of the broadcast information such as the subject(s) of the broadcast information, the source of the broadcast information, entities or objects (e.g., companies, persons, or merchandise) featured in the broadcast information, the category or categories of the broadcast information (e.g., news, travel, weather, sports, etc.), the dates and times related to the broadcast information, etc. The broadcast metadata may comprise other data, as described below.

A user may define items of interest to the user and methods of being informed when such items of interest are detected. A terminal may filter broadcast information by examining the associated broadcast metadata in light of the user preferences. If there is a match, then the terminal may alert the user, as specified, and may also store and/or present the broadcast information to the user.

Comprehensive and detailed broadcast metadata may be valuable to the user in significantly reducing the amount of time the user might otherwise have to spend in manually sorting through less detailed broadcast metadata or broadcast information itself in order to determine whether the broadcast is of interest to the user. Broadcast metadata may also be useful in reducing the amount of broadcast information that is received by a terminal and possibly charged to the user by the broadcast network operator. Broadcast metadata may allow a broadcast sender to target users that may be interested in the broadcast information. Users may place higher value on and may be more likely to receive (e.g., look at and/or listen to) broadcast information that has undergone extensive filtering based on preferred criteria. There may thus be an incentive for both users and broadcast providers to employ many types of filtering criteria in the broadcast metadata. In addition, network operators may charge users and/or broadcast providers for conveying broadcast metadata in addition to broadcast information and hence may also benefit from the use of detailed broadcast filtering.

In an aspect, the broadcast metadata may comprise location and time criteria composed of location criteria and associated time criteria. The location and time criteria may also be referred to as temporal location criteria, location filter, location and time requirements, etc. The terms "criteria" and "requirements" are used interchangeably herein. A location criterion may be given by a target location in which a potential recipient terminal should be within (or outside of) in order for the broadcast information to be pertinent. A time criterion may be given by a time period in which the terminal should be within (or outside of) the target location. This time period may be in the past, present, or future. If the terminal is within (or outside of) the target location during the specified time period, then the terminal may give higher priority to receiving the associated broadcast information and providing this information to the user.

The location and time criteria may be related to the location(s) and time(s) of event(s) associated with the broadcast information, e.g., a sales event, a sporting event, an entertainment event, etc. The event(s) may be in the past, present, or future. Examples of events in the past may include (a) a crime or accident where witnesses are being sought via broadcast information and (b) a mass event in the past (e.g., sports, entertainment, commercial, etc.) where follow up information needs to be sent to those who attended. The location and time criteria may be related to the locations and times at which the broadcast metadata and broadcast information can be received.

Higher priority may be assigned to broadcast information when the location and time criteria in the associated broadcast metadata are met. The higher priority may determine whether the broadcast information is received and possibly stored by the terminal, when and how the user is notified, when and how the broadcast information is provided to the user, etc. The priority of the broadcast information may also be determined based on other factors besides the location and time criteria.

In general, the location and time criteria may relate to past, present, and/or future location of a potential recipient terminal. The location criteria may be given by a set of target locations $L_1, L_2, \ldots, L_N$, where N may be one or greater. A target location may be geographic in nature and may comprise latitude, longitude and possibly altitude coordinates. A target location may also be civil in nature and may comprise street address including town or city and country designations and possibly building, floor, and room designation. A target location may include desired accuracy for the geographic or civil area. A target location may represent a single point, a small area or volume, a larger contiguous area or volume (e.g., a circular geographic area or the total extent of a city), a set of non-contiguous areas or volumes (e.g., the extents of several cities), etc. An area may cover a 2-dimensional (2D) space whereas a volume may cover a 3-dimensional (3D) space. A volume may be useful, e.g., to specify certain floors of a high-rise building. In the case of area and volume descriptions, a terminal may assume higher priority for the broadcast information if the terminal is within an area or volume provided in a location criterion.

The time criteria may relate to the subject of the broadcast, e.g., the date and time of a future sales event. The time criteria may also relate to the location of the terminal (and thus generally of the user) relative to the subject of the broadcast. The time criteria may be given in various formats such as a time period defined by either a start time and an end time or a start time and a duration. The start time and end time may each refer to the past, present, or future. Time may be given in any format and with any level of precision, e.g., by month, week, date, hour, minute, second, etc. Time may also reference an absolute global time system (e.g., GMT or UTC), a regional time system (e.g., US Eastern Daylight Time) or may be relative to when the broadcast metadata is received (e.g. by providing the difference between the start and end times and current time). More than one time period may also be provided.

In one design, the location and time criteria for broadcast information may specify the presence or absence of a terminal for each of a set of target locations, as follows:

$$\text{Location time criteria} = (PA_1 \text{ at } L_1 \text{ during } D_1) LO_1 (PA_2 \text{ at } L_2 \text{ during } D_2) LO_2 (PA_3 \text{ at } L_3 \text{ during } D_3) \ldots LO_{N-1}(PA_N \text{ at } L_N \text{ during } D_N), \quad \text{Eq (1)}$$

where
- $L_n$ denotes a target location for the n-th location and time criterion, for $1 \leq n \leq N$
- $D_n$ denotes a time period or time instant for the n-th location and time criterion,
- $PA_n$ denotes a presence or absence requirement for the n-th location and time criterion, and
- $LO_n$ denotes a logical operation, which may be a logical OR or a logical AND.

In the design shown in equation (1), the location and time criteria are defined by a set of N target locations $L_1$ through $L_N$, where in general $N \geq 1$. Each target location $L_n$, for $1 \leq n \leq N$, may be a single location point, a single area or volume, or a set of areas and/or volumes. N time periods $D_1$ through $D_N$ may be provided for the N target locations $L_1$ through $L_N$, respectively. Each time period $D_n$ may be defined by a start time $TS_n$ and an end time $TE_n$, or $D_n = [TS_n, TE_n]$. $TS_n$ and $TE_n$ may each be defined in the past, present, or future, with $TE_n$ occurring at or after $TS_n$.

In one design, the presence or absence requirement $PA_n$ for each location criterion may have one of the following values:
1. Present for some of the time period with at least a probability of $P_n$,
2. Present for the entire time period with at least a probability of $P_n$,
3. Absent for some of the time period with at least a probability of $P_n$, or
4. Absent for the entire time period with at least a probability of $P_n$.

The probability $P_n$ may be any value between 0 and 1, or $0 \leq P_n \leq 1$.

The location and time criteria in equation (1) combine N individual location and time criteria to obtain an overall requirement for a terminal. Each location and time criterion may be expressed as:

$$LR_n = PA_n \text{ at } L_n \text{ during } D_n, \quad \text{Eq (2)}$$

where $LR_n$ denotes the n-th location and time criterion.

If the probabilities $P_n$ are all 1s, then each location and time criterion in equation (1) specifies whether the terminal is required to be present or absent at or within target location $L_n$ during all or part of time period $D_n$, depending on the value of $PA_n$. If the location of the terminal is known (e.g., because the location was recorded historically or can be predicted with reasonable certainty in the future), then a truth value of either true or false may be assigned to each location and time criterion. The truth values of the N individual location and time criteria may be combined by the logical operations $LO_n$ to obtain a final truth value for the overall requirement in equation (1). The final truth value may indicate whether or not the terminal satisfies the location and time criteria.

Historic locations of a terminal may not be known exactly. In some cases, the stored location of the terminal may refer to a large area in which the terminal was known to be within and may not refer to a precise point. In other cases, the location may have been obtained as a point but with an unknown error due to location computation errors. In yet some other cases, a historic location may be obtained by interpolating between two known locations obtained at different times and may also contain an error. Future locations of the terminal may also be uncertain, e.g., if these locations are obtained as a result of analyzing previous location history.

To mitigate the effects of location errors and uncertainty, a value of less than 1 may be used for probability $P_n$ for target location $L_n$ in equation (1). When $P_n$ is less than 1 for a given location and time criterion, the criterion may be deemed to be true if the terminal meets the presence or absence requirement with a probability of at least $P_n$, and may be deemed to be false otherwise. The overall requirement may then be evaluated as true or false by combining the truth values of the N individual location and time criteria, as described above.

The location and time criteria in equation (1) may be simplified in various manners. In one design, the same target location L may be used for each individual target location $L_n$. In another design, the same presence or absence requirement PA may be used for each individual presence or absence requirement $PA_n$. In yet another design, the same time period D may be used for each individual time period $D_n$. In yet another design, the same probability value P (e.g., P=0.5) may be used for each individual probability $P_n$. In yet another design, the start time for the time period $D_n$ may be omitted and may be assumed to refer to current time. The time periods may also be replaced by a single time instant, which may be given by date and time, just time for the current date, etc. Any combination of the simplifications described above may also be used.

The time periods $D_n$ in equation (1) may be generalized by allowing each time period $D_n$ to contain multiple sub-durations, each with its own start and end date and time. For example, $D_n$ may be defined as 6:00 am to 6:00 pm on a certain Monday together with the same time period on the following Tuesday and Wednesday.

The presence or absence requirements $PA_n$ for each location criterion in equation (1) may be generalized and made more precise by providing the probability of being present or absent at a given location $L_n$ within a given time period $D_n$ for at least a time $T_n$, where $T_n$ is less than or equal to the total time period defined by $D_n$ and need not be contiguous. The values of $T_n$ may express more precisely whether the whole of $D_n$ ($T_n$ equal to the entire duration in $D_n$) or only some of $D_n$ ($T_n$ less than the entire duration in $D_n$) is intended. As an example, $D_n$ may be the time period that starts at 9:00 am on a certain Monday and ends at 6:00 pm, thereby including 9 hours, while $T_n$ may be set to 3 hours. In that case, the presence or absence requirement would refer to the terminal being present or absent for at least 3 hours overall at the given location $L_n$ during the period of 9:00 am to 6:00 pm on the particular Monday. This may be more precise than referring to the terminal being present or absent for some of the period of 9:00 am to 6:00 pm. When $T_n$ is specified for each $D_n$, the presence or absence requirements $PA_n$ may be simplified to one of the following two alternatives:

1. Present at location $L_n$ for at least duration $T_n$ (contiguous or non-contiguous) during overall time period $D_n$ with at least a probability of $P_n$, and
2. Absent at location $L_n$ for at least duration $T_n$ (contiguous or non-contiguous) during overall time period $D_n$ with at least a probability of $P_n$.

In another design, the location and time criteria may be specified as follows:

$$\text{Location time criteria} = LTC_A LO_A LTC_B LO_B LTC_C \ldots, \quad \text{Eq (3)}$$

where
   $LTC_i$ denotes a location and time criterion, for $i \in A, B, C, \ldots$, and
   $LO_i$ denotes a logical operation, which may be a logical AND or a logical OR.

$LTC_i$ may be defined as shown in equation (1). The design in equation (3) allows multiple location time criteria to be combined logically to form more complex location and time criteria.

In yet another design, the location and time criteria may be specified in a recursive manner as follows:

$$\text{Location time criteria} = \text{Expression}(i)\{\text{binary operation Expression}(j)\}, \quad \text{Eq (4)}$$

where
   $\{ \ldots \}$ denotes an optional extension, which may or may not be present,
   Expression( ) denotes {Expression( ) binary operation Expression( )}, or {Unary operation Expression( )}, or (single location and time criterion),
   binary operation denotes logical OR, logical AND, or some other operation on two arguments, and
   unary operation denotes logical NOT or some other operation on one argument.

The single location and time criterion may be given as:

$$\text{Single location and time criterion} = \text{PA at } L \text{ during } D, \quad \text{Eq (5)}$$

where
   L denotes a target location for the location and time criterion,
   D denotes a time period for the location and time criterion, and
   PA denotes a presence or absence requirement for the location and time criterion.

To evaluate equation (4), the truth value of each single location and time criterion may first be determined as either true or false, as described for equation (1). The truth values for all single location and time criteria may be combined using the unary and/or binary operations linking them to yield a final true or false value for the overall requirement in equation (4). A true value for the overall requirement may indicate that the location and time criteria for the broadcast information are satisfied. The user may be provided with or alerted to the availability of the broadcast information, e.g., provided certain other user criteria are also satisfied by the broadcast metadata. A false value may indicate that the location and time criteria are not satisfied and that it is not necessary to inform the user of the broadcast information.

In yet another design, the location and time criteria may be specified in a recursive manner as follows:

$$\text{Location filter}(i) = \text{Location filter}(j) \text{logical operation Location filter}(k), \text{ OR}$$

$$\text{Location filter}(i) = \text{logical operation Location filter}(k), \text{ OR}$$

$$\text{Location filter}(i) = \text{Location and time criterion}(m), \quad \text{Eq (6)}$$

where
   Location and time criterion(m) may be as shown in equation (5), and
   Location filter( ) may comprise one or more location and time criteria.

The designs in equations (1) to (6) use truth values of true and false. A terminal may decide whether it does or does not satisfy each individual location and time criterion, e.g., $PA_n$ at $L_n$ during $D_n$ in equation (1). In some instances, the terminal may partially satisfy the N individual location and time criteria, e.g., satisfy some but not all of the location and time criteria, or satisfy the location and time criteria with a probability lower than but close to the specified probability.

In one design, the terminal may combine the probabilities of satisfying the N individual location and time criteria instead of the truth values of these location and time criteria. Combining probabilities (instead of truth values) for individual location and time criteria may enable more flexible evaluation of the location and time criteria. Equations (1) to (6) may still be used, albeit with a modification for the presence or absence requirement $PA_n$. In one design, $PA_n$ may be defined with the probability aspect removed and may have one of the following values:

1. Present for some of the time period,
2. Present for the entire time period,
3. Absent for some of the time period, or
4. Absent for the entire time period.

Equations (1) to (6) may now define precise requirements for location, which may be composed of a number of individual requirements combined together by logical operations. To compute the value of the overall requirement, the terminal may first compute the probability of each individual location and time criterion (e.g., of the form $PA_n$ at $L_n$ during $D_n$ in equation (1) or PA at L during D in equation (5)) being true. The terminal may then combine the probabilities of the individual location and time criteria using known formulae for determining probability of unions and intersections of multiple events. For example, the following formulae may be used to combine probabilities of two location and time criteria A and B, $$\text{Probability}(A \text{ AND } B) = \text{Probability}(A) * \text{Probability}(B), \text{ and} \quad \text{Eq (7)}$$

$$\text{Probability}(A \text{ OR } B) = \text{Probability}(A) + \text{Probability}(B) - \text{Probability}(A \text{ AND } B). \quad \text{Eq (8)}$$

Equation (7) assumes that A and B are independent events and is an approximation in general. Equation (8) relies on equation (7).

The terminal may compute the overall probability of the entire combination of location and time criteria being true by combining the probabilities of the individual location and time criteria. The terminal may use the overall probability of satisfying all of the individual location and time criteria to decide whether to provide the broadcast information to the user. For example, a threshold probability may be defined (e.g., by the user or a broadcast provider), and the terminal may provide the broadcast information to the user if the overall probability exceeds the threshold probability.

The location and time criteria described herein may depend on the terminal being able to determine its past, current, and/or future locations. The terminal may know its current location via use of a network-supported location solution such as 3GPP, 3GPP2, OMA SUPL, etc. The terminal may also ascertain its current location via use of location capability within the terminal, e.g., GPS. The location of the terminal may be geographic or civil and may be given in any form (e.g., latitude/longitude, a cell ID, a zip code, etc.).

Past or historic locations of the terminal may be obtained in various manners. Past locations may be obtained by periodically obtaining and storing the location of the terminal, e.g., every hour or some other interval. The terminal may also store its location whenever the location is obtained for any application (e.g., direction finding). The terminal may also obtain and store its location whenever built-in sensors detect significant movement (e.g., movement over some minimum distance from any previously determined location) and may store an indication of fixed location at other times. For all of these cases, the locations of the terminal at other times (e.g., at every quarter or half hour) may be obtained by interpolating the stored locations.

Future locations of the terminal may also be obtained in various manners. In one design, future locations may be predicted or extrapolated based on current speed and direction for a moving user and possible inference of a particular route (e.g., along a highway or railway line). This design may be applicable for short periods ahead. In another design, future locations may be inferred from past behavior, e.g., by detecting similar locations historically for certain days and times and assuming that this will recur in the future. For example, the user may normally be at home between 8:00 pm and 8:00 am each day, at work between 9:00 am and 6:00 pm each weekday, etc. Regular movement (e.g., for commuting) and periods of fixed location (e.g., at work or home) at fixed times on certain days in the past may be identified and used to predict future locations. For example, if a user employs a fixed route and an approximately fixed schedule for commuting, then the location of the user along the commuting route at some future time may be predicted with some accuracy, once the user has started the commute, even if the commute is quite long. In yet another design, future locations may be obtained by gaining access to the user's appointment schedule or travel itinerary, e.g., if carried on the terminal or accessible remotely by the terminal. In yet another design, future locations may be manually entered by the user, e.g., for significant events such as vacation or business trip. The terminal may assign a probability to a past or future location due to uncertainty or possible error in the historic or future location.

A location estimate for the terminal may include an area (e.g., a circle, an ellipse, or a circle sector) where the terminal should be located along with a probability (between 0 and 1) that the terminal is actually within this area. Probability may thus be given as part of the location estimate and may be used directly in the location and time criteria. A historic location may have more uncertainty due to the likelihood of having to interpolate between prior location estimates obtained at different times. Similarly, a future location may have more uncertainty due to the use of prediction (e.g., based on past habitual behavior). The probabilities of historic and future locations may be updated accordingly to take into account additional uncertainty due to interpolation, prediction, etc. A probability of 1 (or 100% certainty) may be used for simplification if the target area(s) is sufficiently large (e.g., an entire county, state, or large city), since in that case the location of the terminal being within or outside the large target area(s) would usually be certain.

Filtering of broadcast information based on location and time criteria may be illustrated by the following examples. These examples utilize equations (1) and (3) and assume that truth values (instead of probabilities) for individual location and time criteria are combined.

In a first example, a department store in a shopping mall may hold a large sale on an upcoming Saturday and would like to advertise this sale to people who live nearby, to people who are likely to be present during the sale due to having visited the mall on recent previous Saturdays, and to people who are expected to be in the vicinity of the store during sale hours. To target these users in an advertisement for the sale, the location and time criteria for the broadcast advertisement may be as follows:

$$\text{Location time criteria} = LTC_A \text{ OR } LTC_B \text{ OR } LTC_C. \quad \text{Eq (9)}$$

In equation (9), $LTC_A$ may define a location and time criterion that a terminal (and hence a user) has been present at the mall on at least one of three previous Saturdays with a probability of at least 50%. This means that the user probably visits the mall at least occasionally on Saturdays and may be interested in the sales event. $LTC_B$ may define a location and time criterion that a terminal (and hence a user) has been entirely present in the area (city) surrounding the mall on each of three previous nights with a probability of at least 70%. This makes it likely that the user lives near the mall and again may have an interest in the sales event. $LTC_C$ may define a location and time criterion that a terminal (and hence a user) will be in the city area containing the mall sometime during the sales event with a probability of at least 50%.

$LTC_A$ in equation (9) may be defined with the following parameters in equation (1):
- $PA_1$, $PA_2$, $PA_3$=present for some of the time period with a probability of at least 50%,
- $L_1$, $L_2$, $L_3$=area of the shopping mall,
- $D_1$, $D_2$, $D_3$=each of three previous Saturdays, e.g., with start time=9:00 am and end time=6:00 pm, and
- $LO_1$, $LO_2$=logical OR.

$LTC_B$ in equation (9) may be defined with the following parameters in equation (1):
- $PA_1$, $PA_2$, $PA_3$=present for the entire time period with a probability of at least 70%,
- $L_1$, $L_2$, $L_3$=area of the city containing the shopping mall,
- $D_1$, $D_2$, $D_3$=each of three consecutive previous days, e.g., $D_1$=Monday, $D_2$=Tuesday, $D_3$=Wednesday, with start time=midnight and end time=6:00 am, and
- $LO_1$, $LO_2$=logical AND.

$LTC_C$ in equation (9) may be defined with the following parameters in equation (1):
- $PA_1$=present for some of the time period with a probability of at least 50%,
- $L_1$=area of the city containing the shopping mall, and
- $D_1$=the Saturday of the sale event, e.g., start time=9:00 am and end time=6:00 pm.

$LTC_A$, $LTC_B$ and $LTC_C$ may be combined using logical OR, as shown in equation (9), to obtain an expression that combines the three location and time criteria to target the intended users. The parameters for the expression may be sent in the broadcast metadata for the sale advertisement to target potentially interested users. Additional information such as the type of items on sale, the level of price discounts, the credit interest rate, the name of the store, etc., may also be included in the broadcast metadata. The additional information may enable the terminals to filter based on other user preferences such that the users may be alerted only if both the location and time criteria as well as other user preferences are satisfied.

In a second example, a theme park resort in a certain city may wish to offer preferential discount priced tickets, purchasable in advance, to out-of-town visitors (e.g., on vacation) in order to compete in advance against rival attractions in the same city. To achieve this, the resort may advertise these tickets using the following location and time criteria:

$$\text{Location time criteria} = LTC_A \text{ AND } LTC_B. \quad \text{Eq (10)}$$

In equation (10), $LTC_A$ may define a location and time criterion that a user has been out of the target state or region for the last month and hence probably lives outside the target area. $LTC_B$ may define a location and time criterion that a user be in the vicinity of the theme park sometime in the next two months.

$LTC_A$ in equation (10) may be defined with the following parameters in equation (1):
- $PA_1$=absent for the entire time period with a probability of at least 90%,
- $L_1$=state or region containing the theme park resort, and
- $D_1$=one month time period immediately preceding the advertisement.

$LTC_B$ in equation (10) may be defined with the following parameters in equation (1):
- $PA_1$=present for some of the time period with a probability of at least 30%,
- $L_1$=city or other local area containing the theme park resort, and
- $D_1$=two month time period immediately following the advertisement.

$LTC_A$ and $LTC_B$ may be combined using logical AND, as shown in equation (10), to obtain an expression that combines the two location and time criteria to target the intended users. Additional information (e.g., price discounts, the name of the theme park resort, etc.) may be included in the broadcast metadata to improve filtering by the terminals.

In a third example, a gas station may offer discounted gas prices and may desire to target drivers who live nearby, drivers who regularly travel close by, and drivers who might travel nearby. The following location and time criteria may be used for the discounted gas prices offer:

$$\text{Location time criteria} = LTC_A \text{ OR } LTC_B \text{ OR } LTC_C. \quad \text{Eq (11)}$$

In equation (11), $LTC_A$ may define a location and time criterion that a user has probably been in the general area of the gas station on each of the seven preceding days and thus probably lives nearby. $LTC_B$ may define a location and time criterion that a user has probably been very close to the gas station on each of three preceding weekdays and thus either drives past the gas station regularly or lives or works close by. $LTC_C$ may define a location and time criterion that a user will probably be close to the gas station (e.g., drive past it) during the next hour.

$LTC_A$ in equation (11) may be defined with the following parameters in equation (1):
- $PA_1$, $PA_2$, $PA_3$, $PA_4$, $PA_5$, $PA_6$, $PA_5$=present for some of the time period with a probability of at least 50%,
- $L_1$, $L_2$, $L_3$, $L_3$, $L_5$, $L_6$, $L_7$=area of town containing the gas station,
- $D_1$, $D_2$, $D_3$, $D_4$, $D_5$, $D_6$, $D_7$=each of the seven preceding days, e.g., $D_1$=Monday, $D_2$=Tuesday, $D_3$=Wednesday, $D_4$=Thursday, $D_5$=Friday, $D_6$=Saturday, $D_7$=Sunday, with start time=00:00 am and end time=23:59 pm, and
- $LO_1$, $LO_2$, $LO_3$, $LO_4$, $LO_5$, $LO_6$=logical AND.

$LTC_B$ in equation (11) may be defined with the following parameters in equation (1):
- $PA_4$, $PA_2$, $PA_3$=present for some of the time period with a probability of at least 50%,
- $L_1$, $L_2$, $L_3$=local area of gas station, e.g., restricted to own street and adjacent streets,
- $D_1$, $D_2$, $D_3$=each of three immediately preceding weekdays with start time=00:00 am and end time=23:59 pm, and
- $LO_1$, $LO_2$=logical AND.

$LTC_C$ in equation (11) may be defined with the following parameters in equation (1):
- $PA_1$=present for some of the time period with a probability of at least 50%,
- $L_1$=local area of gas station, e.g., restricted to own street and adjacent streets, and
- $D_1$=one hour time period starting at the current time.

$LTC_A$, $LTC_B$ and $LTC_C$ may be combined using logical OR, as shown in equation (11), to obtain an expression that combines the three location and time criteria to target the intended users. Additional information (e.g., the price discounts at the gas station) may be included in the broadcast metadata to improve filtering by the terminals.

In a fourth example, a travel advisory bureau may wish to provide its subscribers with a travel bulletin concerning the sudden closure of a major highway due to an accident or road problem. The following location and time criteria may be used by the bureau to target the intended users:

$$\text{Location time criteria} = LTC_A \text{ AND } LTC_B. \quad \text{Eq (12)}$$

In equation (12), $LTC_A$ may define a location and time criterion that a user has a 25% chance of passing along or near the closed portion of the highway in the next 2 hours. $LTC_B$ may define a location and time criterion that a user has passed along or has been in proximity to the closed portion of the highway on each of the two preceding days and thus considered as likely to regularly travel along this portion of the highway.

$LTC_A$ in equation (12) may be defined with the following parameters in equation (1):

$PA_1$=present for some of the time with a probability of at least 25%,
$L_1$=closed portion of the highway, e.g., within 200 meters on either side, and
$D_1$=two hour time period starting at the current time.

$LTC_B$ in equation (12) may be defined with the following parameters in equation (1):

$PA_1$, $PA_2$=present for some of the time with a probability of at least 50%,
$L_1$, $L_2$=closed portion of the highway, e.g., within 200 meters on either side,
$D_1$, $D_2$=each of the two preceding days, and
$LO_1$=logical AND.

$LTC_A$ and $LTC_B$ may be combined using logical AND to obtain an expression that combines the two location and time criteria to target the intended users. Broadcast metadata containing the location and time criteria may be broadcast with the bulletin. Additional information (e.g., indicating a traffic advisory) may also be included in the broadcast metadata to improve filtering by the terminals.

The broadcast metadata for location and time criteria for broadcast information may be sent in various manners. In one design, the broadcast metadata may be sent via Mobile Broadcast Services in OMA, which is described in a publicly available document OMA-TS-BCAST_Services-V1_0-20080430-D.

In one design, the broadcast metadata may be sent in a service guide. The service guide may include an element that may be used to specify parameters for location and time criteria for reception of the associated broadcast information. If a match occurs, then a terminal may give higher priority to receiving and displaying the associated broadcast information to the user.

Figure 2:
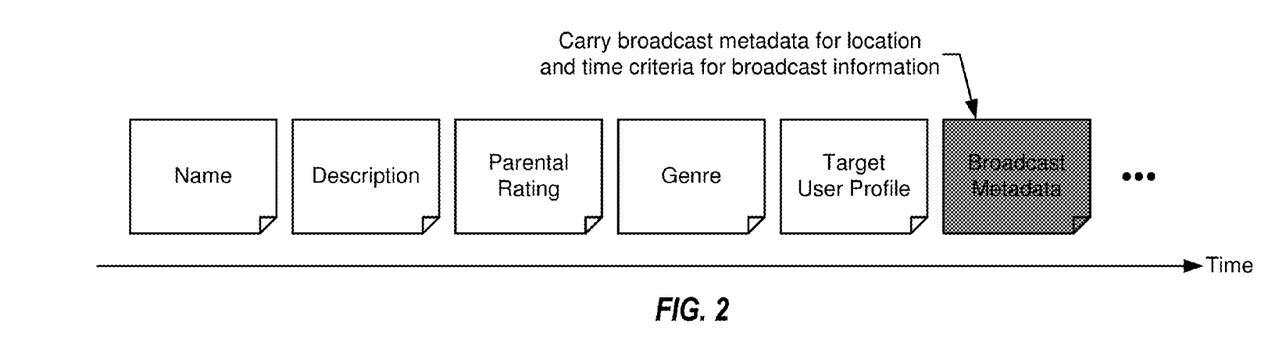
FIG. 2 shows transmission of a service guide with broadcast metadata.

FIG. 2 shows an example transmission of a service guide with broadcast metadata for location and time criteria. The service guide may include Service and Content fragments, where the Service fragments may refer to a whole class of broadcast information and the Content fragments may contain or refer to specific types of broadcast information. Each fragment may carry different information for broadcast programs, where a broadcast program may be a film clip, a TV show, news bulletin, or other type of broadcast information with a particular transmission schedule. A Broadcast Metadata fragment may carry broadcast metadata for location and time criteria for different broadcast programs that may be sent after this fragment. Although not shown in FIG. 2, the broadcast metadata may include other information such as language, subject categories (e.g., weather, news, traffic related, sports, emergency related, advertisement, etc.), media type (e.g., text, video, image, etc.), duration, size, transmission schedule, parental rating, etc., related to the associated broadcast information.

The location and time criteria described herein may allow for transmission of broadcast information and/or broadcast metadata prior to an event related to the broadcast information. The broadcast information may be presented to the user at the time of reception and/or at later times.

Figure 3:
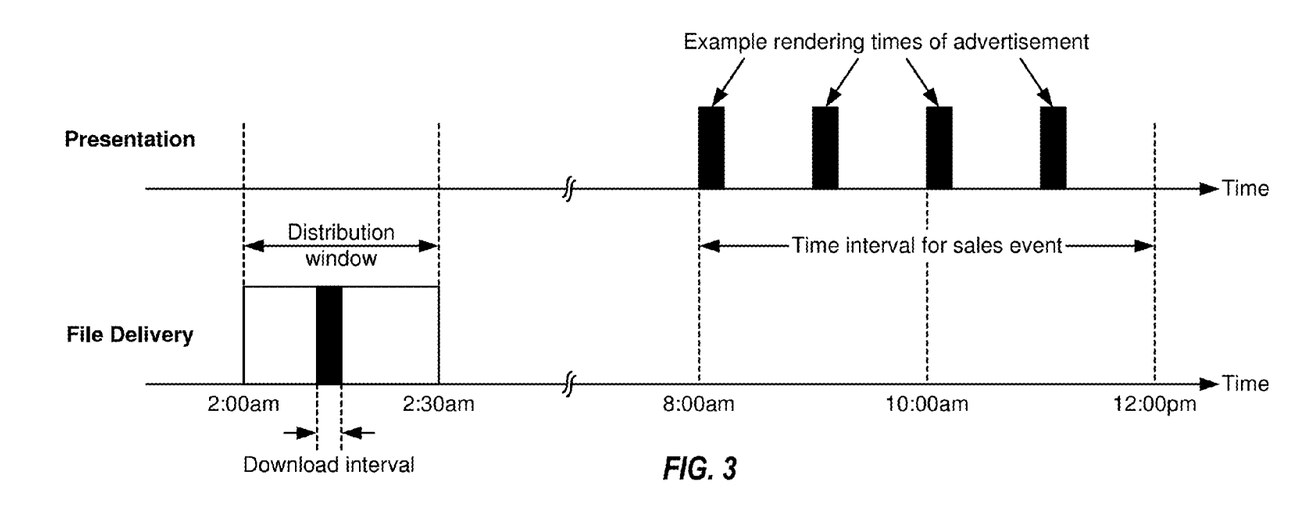
FIG. 3 shows example transmission and presentation of broadcast information.

FIG. 3 shows example transmission and presentation of broadcast information containing an advertisement of a sales event occurring from 8:00 am to 12:00 pm on a given Saturday. In this example, the broadcast metadata and broadcast information for the advertisement may be sent during a distribution window prior to the sales event. This distribution window may be selected to improve utilization of the available network resources. In the example shown in FIG. 3, the distribution window is between 2:00 am and 2:30 am during off-peak traffic hours on Saturday. A terminal may download the broadcast metadata and broadcast information during the distribution window. If there is a match for the location and time criteria in the broadcast metadata, then the broadcast information may be presented to the user prior to and/or during the sales event. Sending the broadcast information and broadcast metadata ahead of the sales event may (i) avoid or reduce broadcasting during the sales event, which may occur during peak traffic hours, and (ii) give users more advance notice of the sales event. If the advertisement is sent during the sales event itself, as also illustrated in FIG. 3, then the cost for sending the advertisement may be higher and the advance notice to users may be less. Hence, there may be an advantage to sending the advertisement ahead of time, which may be filtered with more precise location and time criteria in the broadcast metadata.

Figure 4:
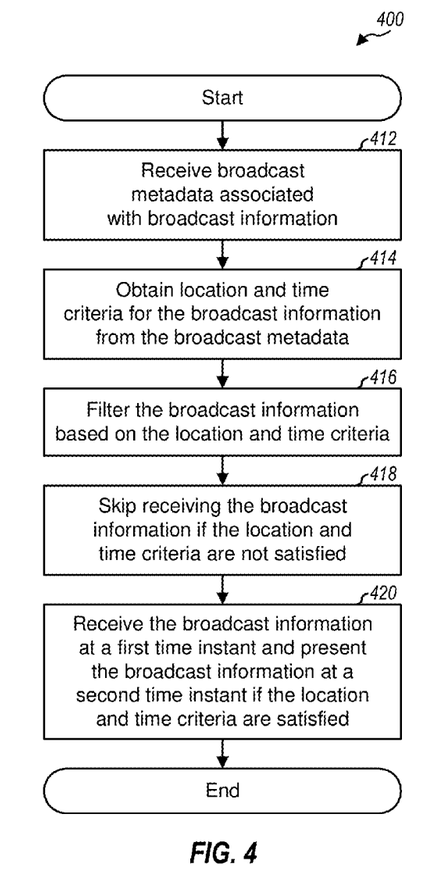
FIG. 4 shows a process for receiving broadcast information.

FIG. 4 shows a design of a process 400 for receiving broadcast information. Process 400 may be performed by a terminal (as described below) or some other entity. The terminal may receive broadcast metadata associated with broadcast information (block 412). The terminal may receive the broadcast metadata prior to the broadcast information, with the broadcast information, via a service guide for broadcast programs comprising the broadcast information, etc. The terminal may obtain location and time criteria for the broadcast information from the broadcast metadata (block 414). The terminal may filter the broadcast information based on the location and time criteria (block 416).

The location and time criteria may comprise at least one location and time criterion. The terminal may evaluate each location and time criterion as follows. The terminal may determine a location criterion and an associated time criterion for the location and time criterion. The location criterion may comprise a target location and a presence or absence requirement. The time criterion may identify a time period in the past, present, or future in which the location criterion applies. The terminal may determine its location within the time period. This location may be a prior location if the time period is in the past, a current location if the time period is in the present, or a future location if the time period is in the future. The terminal may maintain a history of its locations. The terminal may determine its prior location by interpolating at least one location in the history and/or may determine its future location based on the history of locations. The terminal may also determine its location in other manners. In any case, the terminal may determine whether its location meets the location criterion, e.g., by determining whether its location is within or outside the target location as indicated by the presence or absence requirement. The location and time criteria may further comprise at least one logical operation for the at least one location and time criterion. The terminal may combine results of the at least one location and time criterion in accordance with the at least one logical operation to obtain a final result for the location and time criteria.

The location and time criteria may be expressed in various manners. In one design, the location and time criteria may have the form shown in equation (1), and each location and time criterion may have the form shown in equation (2). In another design, the location and time criteria may have the form shown in equation (3). In yet another design, the location and time criteria may have a recursive form shown in equation (4) or (6). The location and time criteria may also be expressed in other manners.

The location and time criteria may be flexibly defined. For example, the location and time criteria may comprise a first location and time criterion covering a prior location of the terminal and a second location and time criterion covering a future location of the terminal. As another example, the location and time criteria may comprise a first location and time criterion requiring the terminal to be within a first target area and a second location and time criterion requiring the terminal to be outside a second target area.

The terminal may skip receiving the broadcast information if the location and time criteria are not satisfied (block 418). The terminal may receive the broadcast information at a first time instant and may present the broadcast information at a second time instant if the location and time criteria are satisfied (block 420). The second time instant may be the same as or later than the first time instant. The broadcast information may relate to an event occurring over a designated time interval and may be received prior to the designated time interval and presented before or during the designated time interval.

The terminal may obtain additional filtering data from the broadcast metadata. The terminal may filter the broadcast information based further on the additional filtering data and at least one user preference. The terminal may decide whether to skip receiving the broadcast information in block 418 or to receive and present the broadcast information in block 420 based further on the results of the filtering with the additional filtering data.

A user may decide whether or not to employ location and time criteria for filtering broadcast information based on privacy issues, terminal capabilities, and other factors. If the user decides not to use location and time criteria, then the terminal may ignore any location and time criteria contained in broadcast metadata and may determine its interest in any broadcast based on other criteria in the metadata. If the user decides to use location and time criteria for filtering broadcast information, then the terminal may retain historic locations and/or perform future location prediction in order to make use of these criteria. In this case, although the terminal may know the user's past locations and may be able to predict future location, the data can be kept secure (e.g., possibly encrypted and stored in a secure memory) such that it is inaccessible by unauthorized parties. The data may be provided to certain authorized parties (e.g., friends and family) using, for example, capabilities defined in SUPL for historic location retrieval. However, in this case, the user may explicitly grant permission (e.g., as supported in SUPL) and may be able to revoke such permission.

The location and time criteria described herein refer to the location of a user at particular times, e.g., at current time or at various times in the past and/or future. Some users may have an interest in locations in which they are not present, e.g., interest in home and/or work locations during a trip away. This may be especially significant for emergency broadcasts (e.g., concerning a hurricane, earthquake, fire or flood). In addition, some users may have an interest in some criteria provided in broadcast metadata that have no location and/or time association, e.g., interest in particular sports events regardless of where and when these occur. To support these interests, terminals may offer the users the possibility of ignoring location and time criteria when certain other criteria appear in broadcast metadata (e.g., certain sporting events). In addition, the user may be allowed to specify location and/or time criteria that are of interest when combined with other criteria that may have no relation to the location of the terminal, e.g., a home or work location in association with an emergency category of broadcast information. Such flexibility may be used to avoid location and time criteria applicable to the terminal from filtering out particular types of broadcast information of interest to the user.

An original source/provider of any broadcast information (e.g., advertiser, news service, public warning service, etc.) may supply the broadcast information and some description of it from which broadcast metadata can be derived. However, the broadcast provider may not provide the broadcast metadata itself (e.g., in the form in which it is provided to terminals) but may instead allow a broadcast network operator or a separate service bureau to derive the metadata from a simpler description provided by the broadcast provider. The details conveyed inside the broadcast information and inside the broadcast metadata may also be transparent to the broadcast network and may thus reduce impacts to the broadcast network operator.

For locations that are very extensive (e.g., area of an entire city), it may be possible to know whether a user is inside or outside the area at the current time or at some time in the past or future with almost 100% probability. In such cases, it may be less ambiguous for the broadcast source to simply indicate a probably of 100% or close to 100% (e.g., 95%) as opposed to some lower probability. The exception may be cases where the user is (or was or will be) close to the edge of the area (within a "border area"). In these cases, different terminal implementations and different position determination methods may produce different results depending on their accuracy and reliability. For example, a user A just inside a target area may be assigned a probability of 70% of being in the area while another user B just outside the target area may be assigned a probability of 95% of being in the area due to error in location. If the broadcast provider had defined a probability of at least 90% of being within the target area, then user A may be regarded wrongly as being outside the area while user B may be regarded wrongly as being inside the area. If the real targeted users are those deep within the area, then the unpredictability for users on the border may not matter. As an example, for a highway closure warning, the main targeted users may be those already on the highway or close to it and not those a significant distance away.

In certain cases, the broadcast provider may desire 100% certainty in reaching the right set of users. To enable 100% certainty, the broadcast provider may decide to over advertise the broadcast or under advertise it. With over advertisement, the target area contained in the broadcast metadata may be a geographically expanded version of the real target location area to ensure that all users in the real target area will be notified at the expense of some users outside this area will also be notified. The broadcast information may then inform users if they are impacted, e.g., via a list of streets affected for an electricity/water outage warning in a certain region of a city. With under advertisement, the target area contained in the broadcast metadata may be a geographically reduced version of the real target area to ensure that all users notified of the broadcast will be in the real target area at the expense of some users in this area will not be notified. Under advertisement may be useful for broadcast providers of an informational or entertainment nature (e.g., news and film clips) that will be sent within a restricted area where the broadcast providers do not wish to alert users who may not be able to later receive this broadcast because they are on the border of the target area.

Figure 5:
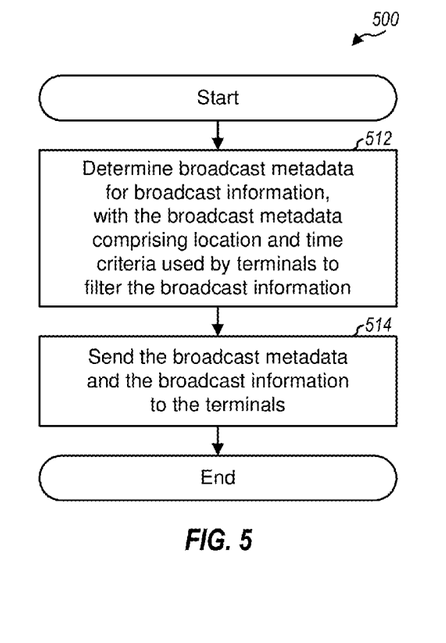
FIG. 5 shows a process for sending broadcast information.

FIG. 5 shows a design of a process 500 for sending broadcast information. Process 500 may be performed by a network entity such as a broadcast center (as described below) or by some other entity. The network entity may determine broadcast metadata for broadcast information, with the broadcast metadata comprising location and time criteria used by terminals to filter the broadcast information (block 512). The location and time criteria may comprise at least one location and time criterion and may have the form shown in equation (1), (3), (4) or (6). Each location and time criterion may have the form shown in equation (2) or (5). The network entity may send the broadcast metadata and the broadcast information to the terminals (block 514). The broadcast information may relate to an event occurring over a designated time interval. The network entity may send the broadcast metadata and the broadcast information prior to the designated time interval in order to improve network resource utilization.

Figure 6:
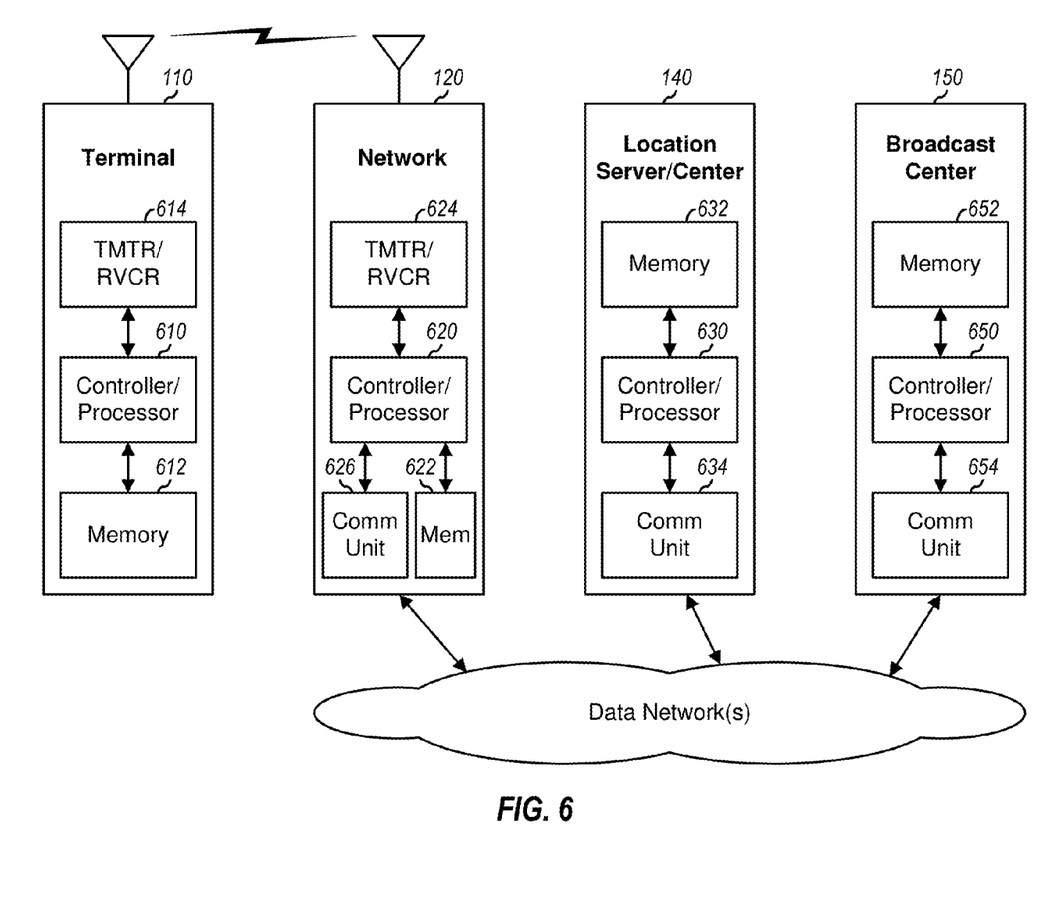
FIG. 6 shows a block diagram of a terminal, a network, a location server/center, and a broadcast center.

FIG. 6 shows a block diagram of a design of terminal 110, network 120, location server/center 140, and broadcast center 150 in FIG. 1. For simplicity, FIG. 6 shows (i) one controller/processor 610, one memory 612, and one transmitter/receiver (TMTR/RCVR) 614 for terminal 110, (ii) one controller/processor 620, one memory 622, one transmitter/receiver 624, and one communication (Comm) unit 626 for network 120, (iii) one controller/processor 630, one memory 632, and one communication unit 634 for location server/center 140, and (iv) one controller/processor 650, one memory 652, and one communication unit 654 for broadcast center 150. In general, each entity may include any number of controllers, processors, memories, transceivers, communication units, etc.

On the downlink, base stations in network 120 may transmit traffic data, broadcast information, broadcast metadata, signaling, and pilot to terminals within their coverage areas. These various types of data may be processed by processor 620, conditioned by transmitter 624, and transmitted on the downlink. At terminal 110, the downlink signals from the base stations may be received via an antenna, conditioned by receiver 614, and processed by processor 610 to recover the various types of information sent by the base stations. Processor 610 may perform or direct process 400 in FIG. 4 and/or other processes for the techniques described herein. Memories 612 and 622 may store program codes and data for terminal 110 and network 120, respectively. On the uplink, terminal 110 may transmit traffic data, signaling, and pilot to the base stations in network 120. These various types of data may be processed by processor 610, conditioned by transmitter 614, and transmitted on the uplink. At network 120, the uplink signals from terminal 110 and other terminals may be received and conditioned by receiver 624 and further processed by processor 620 to recover the various types of information sent by the terminal. Network 120 may communicate with other network entities via communication unit 626.

Broadcast network 130 may be implemented with one or more transmitters, one or more controllers/processors, one or more memories, and one or more communication units that may operate in similar manner as those for network 120.

Within location server/center 140, processor 630 may perform positioning for terminals, provide assistance data to terminals, support location services for terminals and other LCS clients, etc. Memory 632 may store program codes and data for the location center. Communication unit 634 may allow location server/center 140 to communicate with other entities.

Within broadcast center 150, processor 650 may generate and send broadcast metadata and broadcast information. Processor 650 may perform or direct process 500 in FIG. 5 and/or other processes for the techniques described herein. Memory 652 may store program codes and data for the broadcast center. Communication unit 654 may allow the broadcast center to communicate with other entities.

The location and time criteria described herein may provide certain advantages. The location and time criteria may provide a more effective filtering mechanism for the terminals. This may allow the terminals to recover broadcast information of potential interest to the users. The location and time criteria may also allow the broadcast information to be better targeted to the intended users, as illustrated by the examples above. This may result in more effective delivery of broadcast information to the users. The location and time criteria may also allow for more efficient transmission of the broadcast metadata and/or the broadcast information, e.g., during off-peak traffic hours, as illustrated by the example shown in FIG. 3. This may improve utilization of the available network resources.

The location and time criteria described herein may provide advantages over current location criteria that apply to only current location of a terminal. The current location criteria may include one or more target areas for reception of the associated broadcast information. The target area may apply to the current location of the terminal during the broadcast period. The current location criteria may have various limitations. First, the future location (and not the current location) of the terminal may be the relevant filtering criterion in many cases. For example, the time during which an advertisement (or a traffic alert) is valid may be unrelated to the broadcast time of the advertisement (or traffic alert). As an example of current location criteria, an advertisement for a sales event occurring from 8:00 am to 12:00 noon the next Saturday may be sent during 7:00 am to 7:05 am that Saturday or during 5:00 pm to 5:30 pm the previous Friday and may prompt a terminal to check its location between 7:00 am to 7:05 am on Saturday or 5:00 pm to 5:30 pm on Friday, which are not the time or day of the sale. Thus, it may not be feasible to deliver the advertisement in advance using the current location criteria, which may impact efficient utilization of network resources and degree of advance notice to users. In addition, the advertisement may need to be sent multiple times during the sale hours in order to target potential users with the current location criteria. Furthermore, the current location criteria may fail to take advantage of (i) past location behavior (especially of a repetitive nature), if available, which may serve as a reliable predictor of future location, and/or (ii) capability to predict future location. The location and time criteria described herein may overcome the various limitations of the current location criteria.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of sending broadcast information, comprising:
    determining broadcast metadata for broadcast information, the broadcast metadata comprising location and time criteria and a probability threshold, used by terminals to filter the broadcast information, wherein the broadcast metadata is associated with the broadcast information; and
    sending the broadcast metadata and the broadcast information to the terminals.

2. The method of claim 1, wherein the location and time criteria comprise at least one location and time criterion, each location and time criterion comprising a location criterion and a time criterion indicating a time period in which the location criterion applies.

3. The method of claim 1, wherein the probability threshold comprises a presence or absence requirement for the location and time criteria.

4. The method of claim 1, wherein the location and time criteria, and the probability threshold, comprise at least one location and time criterion, each location and time criterion having a form:
    PA at L during D,
    where L denotes a target location for the location and time criterion,
    D denotes a time period for the location and time criterion, and
    PA denotes a presence or absence requirement for the location and time criterion.

5. The method of claim 1, wherein the broadcast information relates to an event occurring over a designated time interval, and wherein the broadcast metadata and the broadcast information are sent prior to or after the designated time interval.

6. An apparatus for sending broadcast information to one or more terminals, comprising:
    a memory;
    at least one processor coupled to the memory and configured to:
        determine broadcast metadata for the broadcast information, the broadcast metadata comprising location and time criteria and a probability threshold, used by the one or more terminals to filter the broadcast information, wherein the broadcast metadata is associated with the broadcast information; and send the broadcast metadata and the broadcast information to the one or more terminals.

7. The apparatus of claim 6, wherein the location and time criteria comprise at least one location and time criterion, each location and time criterion comprising a location criterion and a time criterion indicating a time period in which the location criterion applies.

8. The apparatus of claim 6, wherein the probability threshold comprises a presence or absence requirement for the location and time criteria.

9. The apparatus of claim 6, wherein the location and time criteria, and the probability threshold, comprise at least one location and time criterion, each location and time criterion having a form:

PA at L during D,
where L denotes a target location for the location and time criterion,
D denotes a time period for the location and time criterion, and
PA denotes a presence or absence requirement for the location and time criterion.

10. The apparatus of claim 6, wherein the broadcast information relates to an event occurring over a designated time interval, and wherein the broadcast metadata and the broadcast information are sent prior to or after the designated time interval.

11. An apparatus for sending broadcast information, comprising:
means for determining broadcast metadata for the broadcast information, the broadcast metadata comprising location and time criteria and a probability threshold, used by terminals to filter the broadcast information, wherein the broadcast metadata is associated with the broadcast information; and
means for sending the broadcast metadata and the broadcast information to the terminals.

12. The apparatus of claim 11, wherein the location and time criteria comprise at least one location and time criterion, each location and time criterion comprising a location criterion and a time criterion indicating a time period in which the location criterion applies.

13. The apparatus of claim 11, wherein the probability threshold comprises a presence or absence requirement for the location and time criteria.

14. The apparatus of claim 11, wherein the location and time criteria, and the probability threshold, comprise at least one location and time criterion, each location and time criterion having a form:

PA at L during D,
where L denotes a target location for the location and time criterion,
D denotes a time period for the location and time criterion, and
PA denotes a presence or absence requirement for the location and time criterion.

15. The apparatus of claim 11, wherein the broadcast information relates to an event occurring over a designated time interval, and wherein the broadcast metadata and the broadcast information are sent prior to or after the designated time interval.

16. A non-transitory computer program product residing on a processor-executable computer storage medium, the computer program product comprising processor-executable instructions configured to cause a processor to:
determine broadcast metadata for broadcast information, the broadcast metadata comprising location and time criteria and a probability threshold, used by one or more terminals to filter the broadcast information, wherein the broadcast metadata is associated with the broadcast information; and
send the broadcast metadata and the broadcast information to the one or more terminals.

17. The non-transitory computer program product of claim 16, wherein the location and time criteria comprise at least one location and time criterion, each location and time criterion comprising a location criterion and a time criterion indicating a time period in which the location criterion applies.

18. The non-transitory computer program product of claim 16, wherein the probability threshold comprises a presence or absence requirement for the location and time criteria.

19. The non-transitory computer program product of claim 16, wherein the location and time criteria, and the probability threshold, comprise at least one location and time criterion, each location and time criterion having a form:

PA at L during D,
where L denotes a target location for the location and time criterion,
D denotes a time period for the location and time criterion, and
PA denotes a presence or absence requirement for the location and time criterion.

20. The non-transitory computer program product of claim 16, wherein the broadcast information relates to an event occurring over a designated time interval, and wherein the broadcast metadata and the broadcast information are sent prior to or after the designated time interval.

* * * * *